UNITED STATES PATENT OFFICE.

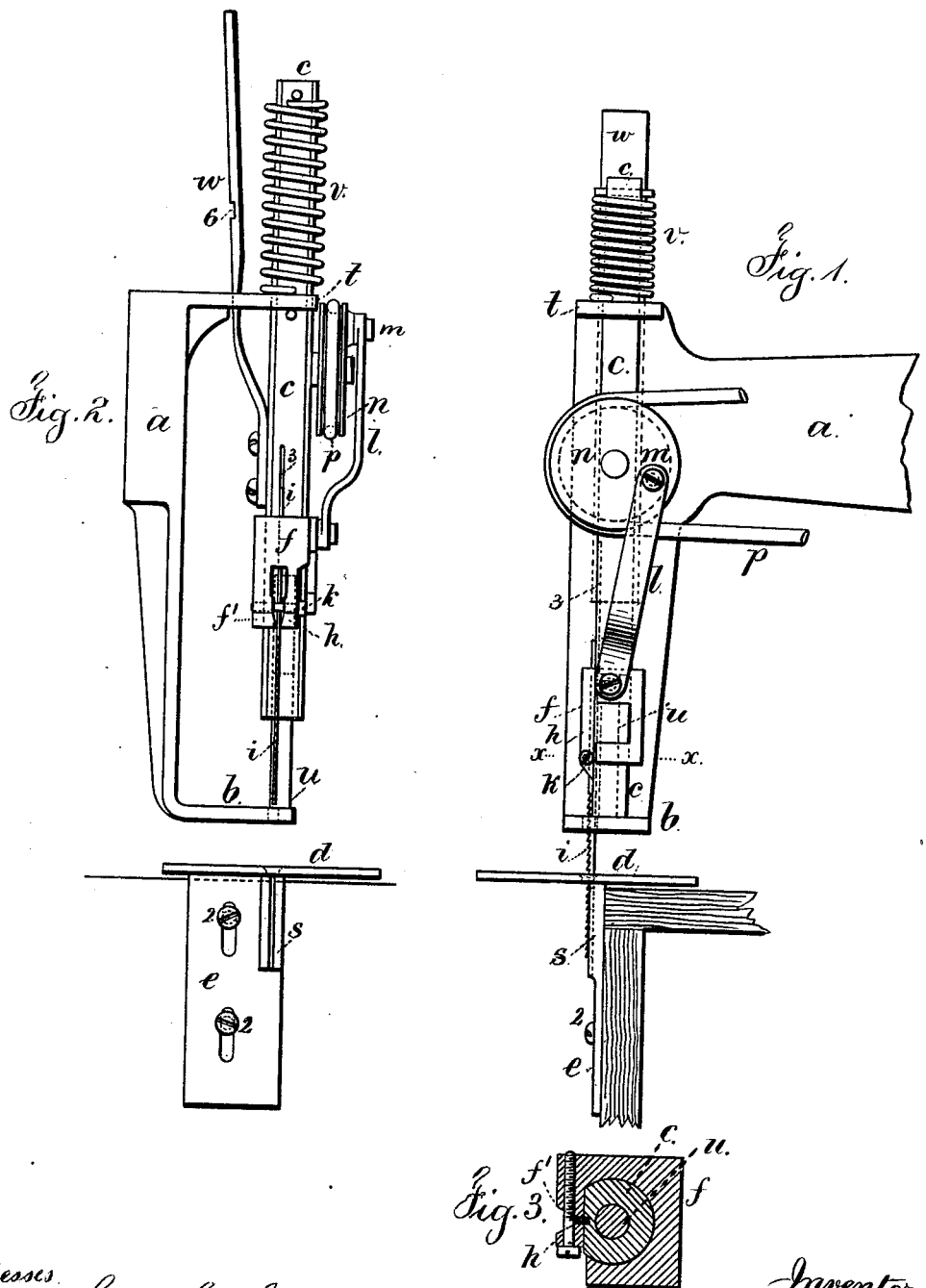

NELSON STAFFORD, OF PAMRAPO, NEW JERSEY.

IMPROVEMENT IN SCROLL-SAWING MACHINES.

Specification forming part of Letters Patent No. 198,426, dated December 18, 1877; application filed November 15, 1877.

*To all whom it may concern:*

Be it known that I, NELSON STAFFORD, of Pamrapo, in the county of Hudson and State of New Jersey, have invented an Improvement in Scroll-Saws, of which the following is a specification:

Saws for fine scroll and inlay work are usually grasped at the ends and kept under tension by a spring-arm, the crank acting to draw down the saw against the tension of the spring. In all these saws it is necessary to unfasten one end to pass the same through a hole bored in the wood previous to sawing the opening in the pattern, and as there are often a number of openings through the wood, with more or less ornamental outlines, the saw has to be unfastened frequently, and it is not always easy to refasten said saw. Besides this, the saw, only being held near the ends, is liable to become bent into an arc of a circle and misplaced; hence the sawing is not accurate.

My invention is for overcoming these difficulties, and relates to a saw that is clamped by a reciprocating holder, and moved up and down within guide-grooves above and below the bed, so that the saw is definitely held above and below the material, and the tension of a spring dispensed with. I also provide a means for giving to the reciprocating holder an end movement, whereby the saw is drawn out of the wood, and the wood can be removed and the saw inserted into another of the holes bored in the same.

In the drawing, Figure 1 is an elevation of the saw as in position for use. Fig. 2 shows the saw raised to allow for the introduction of the wood between the bed and foot; and Fig. 3 is a section in larger size of the clamp for holding the saw.

The arm $a$ is of any desired length, and is connected to the bed or frame of the machine in the usual manner. The foot $b$ is shown as a fixture upon or formed with the arm $a$, in order that it may firmly support the lower part of the slide $c$, upon which the saw and saw-holder are reciprocated.

In order to vary the distance between the bed $d$ and foot $b$ according to the thickness of the material operated upon, the bed $d$ is shown as attached to the vertical bar $e$, that is slotted for the screws 2, so that the same may be raised, lowered, and clamped in the desired position.

It will, however, be apparent that the bed may be stationary and a supplemental foot made use of, the same extending below the foot $b$ to prevent the wood rising with the saw; or the foot and parts connected therewith may be raised or lowered. If the bed is stationary, the foot $b$ and frame may be supported in guides upon the arm $a$, and provided with adjusting or clamping screws, so as to raise or lower the foot and the saw mechanism according to the thickness of the wood, so that the saw will be supported, except where it passes through the wood.

In the slide-bar $c$ there is a groove, 3, for the back edge of the saw $i$, and around the bar $c$ is the slide $f$, that is slotted for the saw to be passed in between the slide $f$ and bar $c$; and the saw is clamped between the parts $f'$ and $h$, that are attached to or formed with the slide $f$, the opening between these parts $f'$ and $h$ being V-shaped and in line with the slots aforesaid, so that the saw may be grasped firmly upon tightening the clamping-screw $k$ without injury to the set of the teeth.

The saw-clamp is guided upon the bar $c$ by the side of said bar being flattened, or by a key or feather, or by a guide-bar at the side of and parallel with the bar $c$, so as to keep the saw-clamp correctly in position, but allow the same to be moved up and down freely, carrying the saw with it, and to effect this reciprocation the pitman $l$, crank-pin $m$, and pulley $n$, that is driven by a band, $p$, to a fly-wheel or other device driven by power.

The saw is set so that it passes through a hole in the foot $b$ and through a countersunk hole in the bed $d$, and its lower end enters the groove of the block $s$ below the bed, and the position of the saw is such that its lower end will not draw up out of this groove in $s$ while in use. Hence the saw is held firmly in position, but it is free to be reciprocated, and the sawing is done by the endwise thrust or drawing movement without the use of a spring to keep the saw under tension; but in consequence of the saw being kept straight and supported, except where the sawing is being done, there is but little risk of the saw being broken, and the saw can be moved down and cut off from time to time to bring the sharp unused teeth into action.

In order to provide for inserting the saw through a hole bored through a piece of wood I make the bar $c$ movable vertically. It is guided at top by the arm $t$, and at bottom by a pin, $u$, fastened to the foot $b$, and entering the tubular end of said bar $c$. This allows the pulley $n$, pitman $l$, saw-clamp $f'$ $h$, and saw to be raised, so that the saw is clear of the wood, the crank-pin $m$, of course, being at its highest point. I prefer to use the spring $v$ to aid in raising the parts and sustaining them when raised, and to employ the spring-catch and holding-bar $w$, that is fastened to the slide-bar $c$ at the lower end, and passes through a mortise in the arm $t$; and there is a notch at 6 that catches upon the arm when the slide-bar and parts are depressed, so as to hold them down while the sawing progresses.

The operator, after placing the wood upon the bed, turns the pulley $n$ with his hand so as to run the lower end of the saw down through the hole in the wood and through the bed into the slot in the block $s$, and then slides down the bar $c$ and parts carried by it, and the saw is ready to be started by power.

I claim as my invention—

1. The reciprocating saw-clamp $f$, slide-bar $c$, and foot $b$, in combination with the bed $d$ and the guide-slot for the saw beneath the bed, substantially as set forth.

2. The saw-clamp $f$, made with the spring clamping-bar $h$ and screw $k$, in combination with the bar $c$, grooved for the back of the saw, substantially as set forth.

3. In combination with the saw-clamp $f$ and pitman $l$, the bar $c$, upon which the saw-clamp slides, the guides at top and bottom for the bar $c$, and the holding-bar $w$, substantially as set forth.

4. The adjustable bed, in combination with the stationary foot, reciprocating saw-clamp, and saw, substantially as set forth.

Signed by me this 14th day of November, A. D. 1877.

N. STAFFORD.

Witnesses:
 GEO. T. PINCKNEY,
 WILLIAM G. MOTT.